(12) United States Patent
Gouglev et al.

(10) Patent No.: US 8,762,840 B1
(45) Date of Patent: Jun. 24, 2014

(54) ELASTIC CANVAS VISUAL EFFECTS IN USER INTERFACE

(71) Applicant: Beamberry Solutions Inc. d/b/a SLG Mobile, Inc., Centreville, VA (US)

(72) Inventors: Dimitar Gouglev, Vienna, VA (US); David Shalamberidze, Fairfax, VA (US); Evgeny Lebanidze, Centreville, VA (US); Shota Shalamberidze, Tbilisi (GE)

(73) Assignee: Beamberry Solutions Inc. d/b/a SLG Mobile, Inc., Centreville, VA (US)

( * ) Notice: Subject to any disclaimer, the term of this patent is extended or adjusted under 35 U.S.C. 154(b) by 0 days.

(21) Appl. No.: 13/832,569

(22) Filed: Mar. 15, 2013

Related U.S. Application Data

(63) Continuation of application No. 12/987,132, filed on Jan. 9, 2011.

(51) Int. Cl.
*G06F 3/01* (2006.01)

(52) U.S. Cl.
USPC .............................. 715/702; 345/173; 345/647

(58) Field of Classification Search
CPC .. G06F 3/0485; G06F 1/1652; H04N 1/00411
USPC ..................................... 715/702; 345/173, 647
See application file for complete search history.

(56) References Cited

U.S. PATENT DOCUMENTS

| | | | |
|---|---|---|---|
| 2011/0074699 A1* | 3/2011 | Marr et al. | 345/173 |
| 2011/0090255 A1* | 4/2011 | Wilson et al. | 345/647 |
| 2011/0163967 A1* | 7/2011 | Chaudhri | 345/173 |
| 2012/0105464 A1* | 5/2012 | Franceus | 345/581 |
| 2013/0031507 A1* | 1/2013 | George | 715/784 |

OTHER PUBLICATIONS

Beta version of BeamReader PDF Viewer, released on Nov. 10, 2009 (see attached Declaration).

* cited by examiner

*Primary Examiner* — Amy Ng
*Assistant Examiner* — Andres E Gutierrez
(74) *Attorney, Agent, or Firm* — Steptoe & Johnson LLP

(57) ABSTRACT

A user interface method is provided for use in a device having a touchscreen. The method includes maintaining the state of content displayed on the device, determining a display image, applying a transformation to at least a portion of the display image based on the maintained state of the displayed content on the device, and displaying the transformed image on the device. The user interface detects transitions, such as, for example, page transitions, and the like, and updates the state based on detected transitions.

15 Claims, 13 Drawing Sheets

```
/*
 * PDFView.java
 * BeamReader PDF Viewer
 * Copyright © 2009-2010 SLG Mobile, Inc.
 * All Rights Reserved.
 */
public float scrollX;
public float scrollY;
private int upPageTransition;
private int downPageTransition;
public float zoomF;
private boolean touchDown;
private int topBlock1;
private int topBlock2;
private int bottomBlock1;
private int bottomBlock2;
private Bitmap bitmap;
private Matrix m;
private android.widget.Scroller scroller;
private float startScrollX;
private float startScrollY;
private float lastScrollX, lastScrollY;
private boolean hdpi;

...
scroller = new Scroller(context,
            new android.view.animation.DecelerateInterpolator(2.0f));

```
@Override
    public boolean onTouchEvent(MotionEvent event) {
        if (event.getAction() == MotionEvent.ACTION_DOWN) {
            touchDown = true;
                /* Set current scroll X and Y coordinates. */
                ...

} else if (event.getAction() == MotionEvent.ACTION_MOVE) {
            if (multitouchMode) {
                /* Handle multi-touch mode. */
                ...
            }
            if (Math.abs(lastScrollX) < (hdpi?6:3)
                        && Math.abs(lastScrollY) < (hdpi?6:3)) {
                return true;
            }

...

detectPageTransition();
            invalidate();
        } else if (event.getAction() == MotionEvent.ACTION_UP) {
            touchDown = false;

/* Set current scroll X and Y coordinates. */
                ...

if((x != 0 || lastScrollY != 0) && (!changingPage)) {
                scroller.startScroll(x, (int)event.getY(),
                        x==0?0:(int)-(lastScrollX * (hdpi?18:10)),
                        (int)-(lastScrollY * (hdpi?18:10)), 750);
            } else {
                scroller.abortAnimation();
            }
            detectPageTransition();

}
    }

...

@Override
    protected void onDraw(Canvas canvas) {
        if (whitePaint == null) {
            whitePaint = new Paint();
            whitePaint.setColor(0xffffffff);
            whitePaint.setStyle(Paint.Style.FILL);
        }

...

if (pdf != null) {
            paint(canvas, canvas.getClipBounds(),
                    (int)scrollX, (int)scrollY, hMargin, vMargin,
                    screenWidth, screenHeight, zoomF,
                    this, curPage, dither);
        } else {
            Rect clipRect = canvas.getClipBounds();
            canvas.drawRect(clipRect, whitePaint);
        }

```
private void detectPageTransition() {
    if (topBlock1 == -1 || bottomBlock1 == -1) {
        upPageTransition = downPageTransition = 0;
        return;
    }
    upPageTransition = (int)scrollY - topBlock1 + 1;
    if (scrollY >= topBlock1) {
        upPageTransition = (int)scrollY - topBlock1 + 1;
    }
    if (scrollY < topBlock1) {
        upPageTransition = 0;
        if (PageTransitionMove && lastPageTransition == PAGETRANSITION_UP) {
            scrollY = topBlock1 - 1;
            autoScrollIncY = 0;
            PageTransitionMove = false;
            postInvalidate();
        }
    }
    if (scrollY > topBlock2 || (scrollY >= topBlock1 && scroller.isFinished())) {
        if ((!touchDown) && (!PageTransitionMove)) {
            scroller.abortAnimation();
            autoScrollIncY = -upPageTransition / 8;
            if (autoScrollIncY > -5) {
                autoScrollIncY = -5;
            }
            PageTransitionMove = true;
        }
        if ((!changingPage) && touchDown && scrollY > topBlock2) {
            if (curPage < numOfPages) {
                changePage(curPage + 1);
            }
        }
    }
    if (upPageTransition != 0) {
        lastPageTransition = PAGETRANSITION_UP;
    } downPageTransition = -((int)scrollY - bottomBlock1 + 1);
    if (scrollY < bottomBlock1) {
        downPageTransition = -((int)scrollY - bottomBlock1 + 1);
    }
    if (downPageTransition < 0 || upPageTransition != 0) {
        downPageTransition = 0;
    }
    if (scrollY > bottomBlock1) {
        downPageTransition = 0;
        if (PageTransitionMove && lastPageTransition == PAGETRANSITION_DOWN) {
            scrollY = bottomBlock1;
            autoScrollIncY = 0;
            PageTransitionMove = false;
            postInvalidate();
        }
    }
    if (scrollY < bottomBlock2
            || (scrollY < bottomBlock1 && scroller.isFinished())) {
        if ((!touchDown) && (!PageTransitionMove)) {
            scroller.abortAnimation();
            autoScrollIncY = downPageTransition / 8;
            if (autoScrollIncY < 5) {
                autoScrollIncY = 5;
            }
            PageTransitionMove = true;
        }
        if ((!changingPage) && touchDown && scrollY < bottomBlock2) {
            if (curPage > 1) {
                changePage(curPage - 1);
            }
        }
    }
    if (downPageTransition != 0) {
        lastPageTransition = PAGETRANSITION_DOWN;
    }
}
...
```

FIG. 5C

```
public int getTopBlock2(int page) {
    return getTopBlock1(page) + screenHeight / 3;
} public int getBottomBlock1(int page) {
    if (page == 1) {
        return -1000000000;
    }
    RectF r = getPageBoundsPixels(page, zoomF);
    int middle = screenHeight >> 1;
    if (r.bottom < middle + (middle >> 1)) {
        return curPageGlobalOffset - screenHeight + (int)r.bottom + vMargin;
    }
    return curPageGlobalOffset - (middle >> 1);
} public int getBottomBlock2(int page) {
    return getBottomBlock1(page) - screenHeight / 3;
} private void updatePageOffset() {
    int i = curPage - 3;
    if (i < 1) {
        i = 1;
    }
    int offset = vMargin;
    for (; i < curPage; i++) {
        RectF r = getPageBoundsPixels(i, getPageZoom(curPage));
        offset += r.bottom + vMargin;
    }
    curPageGlobalOffset = offset;
    topBlock1 = getTopBlock1(curPage);
    topBlock2 = getTopBlock2(curPage);
    bottomBlock1 = getBottomBlock1(curPage);
    bottomBlock2 = getBottomBlock2(curPage);
}

```
public void paint(Canvas g, Rect clip,
        int scrollX, int scrollY, int hMargin, int vMargin,
        int screenWidth, int screenHeight, float zoomF,
        int curPage, boolean dither) {
    try {
        this.zoomF = zoomF;
        RectF of = null;
        RectF _of = new RectF();
        RectF f = null;
        of = resolver.getPageBoundsPixels(curPage, zoomF);
        float canvasWidth = of.right;
        if (canvasWidth < screenWidth) {
            hMargin = (screenWidth - (int)canvasWidth) / 2;
        }
        int sx = scrollX;
        int sy = scrollY;
        float mx = zoomF;
        float my = zoomF;
        m = new Matrix();

g.save();
        float offset = 0;
        int firstPage = curPage - 3;
        if (firstPage < 1) {
            firstPage = 1;
        }

Paint p = new Paint();
        g.drawRGB(0xaa, 0xaa, 0xaa);
        p.setAntiAlias(true);
        for (int i = firstPage; i < curPage; i++) {
            g.restore();
            g.save();
            of = resolver.getOriginalPageBoundsPixels(i);
            if (of == null) {
                continue;
            }
            float zf = resolver.getPageZoom(i);
            f = resolver.getPageBoundsPixels(i, zf);
            if (f.right < screenWidth) {
                hMargin = (screenWidth - (int)f.right) / 2;
            } sx = scrollX;
            sy = scrollY;
            mx = my = zf;
            if (sx < 0) {
                mx += (float)-sx / (hdpi?900.0f:750.0f);
                sx = sx / 2;
            }
            if (f.right > screenWidth) {
                int sw = screenWidth - hMargin - hMargin;
                if (sx + sw > f.right) {
                    float mmx = (((float)sx + (float)sw) - f.right)
                            / (hdpi?900.0f:750.0f);
                    mx += mmx;
                    float ssx = ((float)sx + (float)sw) - f.right;
                    sx = (int)(resolver.getOriginalPageBoundsPixels(i).right * mx -
                        screenWidth + hMargin + hMargin + (ssx * (1.0f + mmx)) / 2.0f);
                }
            }
            g.translate(-(sx - hMargin), -(sy - vMargin - offset));
            m.setScale(mx, my);
            m.mapRect(_of, of);
            offset += _of.bottom + vMargin;

p.setColor(0xffdddddd);
            p.setStyle(Paint.Style.FILL);
            g.drawRect(_of, p);

p.setColor(0xff121212);
            p.setStyle(Paint.Style.STROKE);
            g.drawRect(_of, p);
    }
```

FIG. 5E

```
g.restore();
    g.save();
    sx = scrollX;
    sy = scrollY;
    mx = zoomF;
    my = zoomF;
    if (sx < 0) {
        mx += (float)-sx / (hdpi?900.0f:750.0f);
        sx = sx / 2;
    }
    if (curPage == 1 || curPage == resolver.getNumberOfPages()) {
        if (sy < 0) {
            my += (float)-sy / (hdpi?900.0f:750.0f);
            sy = sy / 2;
        }
    }
    RectF bounds = getPageBoundsPixels(curPage, zoomF);
    if (bounds.right > screenWidth) {
        int sw = screenWidth - hMargin - hMargin;
        if (sx + sw > bounds.right) {
            float mmx = (((float)sx + (float)sw) - bounds.right)
                                    / (hdpi?900.0f:750.0f);
            mx += mmx;
            float ssx = ((float)sx + (float)sw) - bounds.right;
            sx = (int)(resolver.getOriginalPageBoundsPixels(curPage).right * mx -
                    screenWidth + hMargin + hMargin + (ssx * (1.0f + mmx)) / 2.0f);
        }
    }
    m.setScale(mx, my);
    int upPageTransition = getUpPageTransition();
    if (upPageTransition != 0) {
        my = my * ((bounds.bottom - upPageTransition) / bounds.bottom);
        m.setScale(mx, my);
    }
    int downPageTransition = getDownPageTransition();
    if (downPageTransition != 0) {
        my = my * ((bounds.bottom - downPageTransition) / bounds.bottom);
        m.setScale(mx, my);
    }
    g.translate(-(sx - hMargin), -(sy - vMargin - upPageTransition - offset));

of = resolver.getOriginalPageBoundsPixels(curPage);
    m.mapRect(_of, of);

if (bitmap != null) {
        g.drawBitmap(bitmap, m, p);
    } else {
        p.setColor(0xffffffff);
        p.setStyle(Paint.Style.FILL);
        g.drawRect(_of, p);
    } p.setColor(0xff121212);
    p.setStyle(Paint.Style.STROKE);
    g.drawRect(_of, p);

if (upPageTransition != 0) {
        offset += of.bottom * zoomF + vMargin;
    } else {
        offset += _of.bottom + vMargin;
    }
```

FIG. 5F

```
for (int i = 1; i < 4; i++) {
    if (curPage + i <= resolver.getNumberOfPages()) {
        g.restore();
        g.save();
        of = resolver.getOriginalPageBoundsPixels(curPage + i);
        if (of == null) {
            continue;
        }
        float zf = resolver.getPageZoom(curPage + i);
        f = resolver.getPageBoundsPixels(curPage + i, zf);
        if (f.right < screenWidth) {
            hMargin = (screenWidth - (int)f.right) / 2;
        } sx = scrollX;
        sy = scrollY;
        mx = my = zf;
        if (sx < 0) {
            mx += (float)-sx / (hdpi?900.0f:750.0f);
            sx = sx / 2;
        }
        if (curPage == 1 || curPage == resolver.getNumberOfPages()) {
            if (sy < 0) {
                my += (float)-sy / (hdpi?900.0f:750.0f);
                sy = sy / 2;
            }
        }
        if (f.right > screenWidth) {
            int sw = screenWidth - hMargin - hMargin;
            if (sx + sw > f.right) {
                float mmx = (((float)sx + (float)sw) - f.right)
                                        / (hdpi?900.0f:750.0f);
                mx += mmx;
                float ssx = ((float)sx + (float)sw) - f.right;
                sx = (int)(resolver.getOriginalPageBoundsPixels(curPage + i).right * mx -
                    screenWidth + hMargin + hMargin + (ssx * (1.0f + mmx)) / 2.0f);
            }
        }
        g.translate(-(sx - hMargin), -(sy - vMargin - offset));
        m.setScale(mx, my);
        m.mapRect(_of, of);
        offset += _of.bottom + vMargin;

p.setColor(0xffdddddd);
        p.setStyle(Paint.Style.FILL);
        g.drawRect(_of, p);

p.setColor(0xff121212);
        p.setStyle(Paint.Style.STROKE);
        g.drawRect(_of, p);
    }
} catch (Throwable t) {
    // ignore
} finally {
    g.restore();
}
}
```

ELASTIC CANVAS VISUAL EFFECTS IN USER INTERFACE

CLAIM OF PRIORITY

This application is a continuation of U.S. Ser. No. 12/987,132, filed on Jan. 9, 2011, which is incorporated by reference in its entirety.

TECHNICAL FIELD

The present invention relates generally to computer user interface systems and, more particularly, to user interfaces for touchscreen devices.

BACKGROUND

Some mobile devices, such as, for example, smartphones, personal pocket computers, personal digital assistants, tablets, and the like, incorporate a touchscreen, which is an electronic visual display that can detect the presence and/or location of a touch within the display. A touchscreen enables a user to interact directly with displayed content, providing an immersive user experience. For example, a user can slide a finger across the touchscreen to scroll a displayed screen content, document or webpage.

Various touchscreen technologies have been used, including, by way of example, capacitive touchscreen panels, which sense changes in capacitance caused by a finger, or other conductive device touching the panel. These touchscreens are capable of detecting the location of input gestures, such as single or multiple finger taps or drags. Some touchscreens are capable of detecting multiple simultaneous input touches, thus enabling more complex input gestures, including two-finger drags, two-finger taps, and pinch/expand (i.e., two fingers drawn together or apart on the touchscreen panel).

In addition, some mobile devices also include accelerometers that can be used to sense, for example, orientation, acceleration, vibration, shock, and the like. In the Apple iPhone device, an accelerometer is used for, inter cilia, sensing the display orientation, thus allowing a user to switch between landscape and portrait modes by simply rotating the device. Accelerometers are also used as another mechanism for a user to control a device. For example, accelerometers are sometimes used as input devices, allowing users to control the device by tilting it in the desired direction. This technique is used in the RotoView tilt-and-scroll system, which provides tilt-based navigation in hand held devices. See http://www.rotoview.com.

Using touchscreens and/or accelerometers, mobile devices enable users to view multi-page documents and other content. For example, the Apple iPhone device enables a user to view multi-page documents in Adobe PDF format, scrolling through a page using single-finger drags. When the end of a page is reached, scrolling continues to the next pages, and so on. When the beginning or end of the document is reached, the iPhone device pans the display such that the edge of the document (i.e., the beginning or end of the document) is displayed at or near the edge of the display. This effect is referred to herein as a rigid bouncing effect.

SUMMARY OF THE INVENTION

Generally, a user interface method is provided for use in a device having a touchscreen. The method includes maintaining the state of content displayed on the device, determining a display image, applying a transformation to at least a portion of the display image based on the maintained state of the content displayed on the device, and displaying the image on the device. The user interface detects transitions, such as, for example, the beginning or end of the content, page transitions, and the like, and updates the state based on detected transitions. The content may include, by way of example and not by way of limitation, documents, images, menus, or other data.

In some implementations, the transformation is applied using an affine transformation to support stretching or squeezing the display image in one or more directions, or by otherwise deforming the display image.

Also, some implementations perform elastic canvas visual effects in conjunction with content scrolling. Scrolling may be performed in response to user input (e.g., the touchscreen, mouse, keyboard, accelerometer, etc.), or may be performed automatically.

In another general aspect, a device is provided that includes a central processing unit, a touchscreen unit, and a non-transitory computer readable medium that stores software usable to cause the device to perform an elastic canvas visual effect.

BRIEF DESCRIPTION OF THE DRAWING

For a more complete understanding of the present invention, and the advantages thereof, reference is now made to the following descriptions taken in conjunction with the accompanying drawing, in which:

FIGS. 5A-5G list source code to enable an elastic canvas visual effect in a user interface system according to one implementation.

DETAILED DESCRIPTION

Figure 1A:
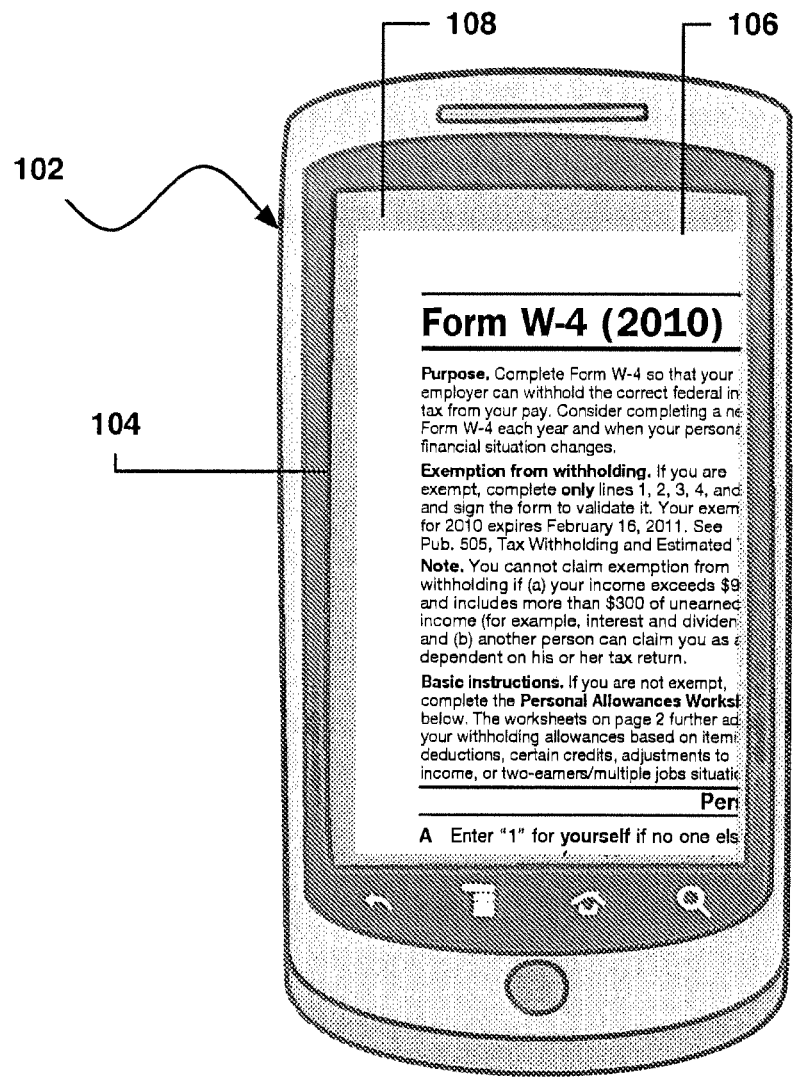
FIG. 1A is a diagram of a mobile device.

Referring now to the drawing, wherein the showing is for purposes of illustrating a preferred embodiment of the present invention and is not for purposes of limiting the same. FIG. 1A shows a mobile device 102 that includes a touchscreen 104. The mobile device 102 may be implemented using devices such as, for example, smartphones, personal pocket computers, personal digital assistants, tablet and the like. The touchscreen 104 may employ any touchscreen technology, including, by way of example and not by way of limitation, resistive, surface acoustic wave, capacitive, infrared, optical imaging, dispersive signal, and/or acoustic pulse recognition technologies. In one implementation, touchscreen 104 is implemented using a mutual capacitance touchscreen panel enabling recognition of multi-touch gestures.

When using touchscreen scrolling, a user may prematurely scroll past the end of a displayed screen or page. This may result in undesirable consequences including: (i) unintended transitions may cause a user to become lost or disoriented as to his or her location within the content 106; (ii) rendering lag effect caused by unwanted rendering/re-rendering of the display (which can be aggravating for the user if the transition was unintentional and the user has to navigate back); and/or (iii) other ill effects. There is a desire to reduce the impact of these undesirable consequences. Furthermore, there is a desire to provide tangible feedback to users associated with reaching the edge of the content 106.

The mobile device 102 is configured to display content 106 such as, for example, menus, webpages, images, documents, and other screen content. Using the touchscreen 104, a user can cause the mobile device 102 to scroll the displayed content 106. The mobile device 102 is configured to reduce the likelihood of unintentional transitions and provides tangible feedback to indicate to users that the edge of the content 106 has been reached by using an elastic canvas visual effect.

The elastic canvas visual effect is a transformation of at least a portion of displayed content 106. In some implementations, the elastic canvas visual effect is performed by applying an affine transformation to the displayed image. By displaying the elastic canvas visual affect when a user nears the edge of displayed content 106, the user receives feedback that a page/screen transition is near. This allows the user to stop scrolling before an unintended transition actually occurs, thus improving the user experience along with potentially preventing unnecessary rendering/re-rendering.

Figure 1B:
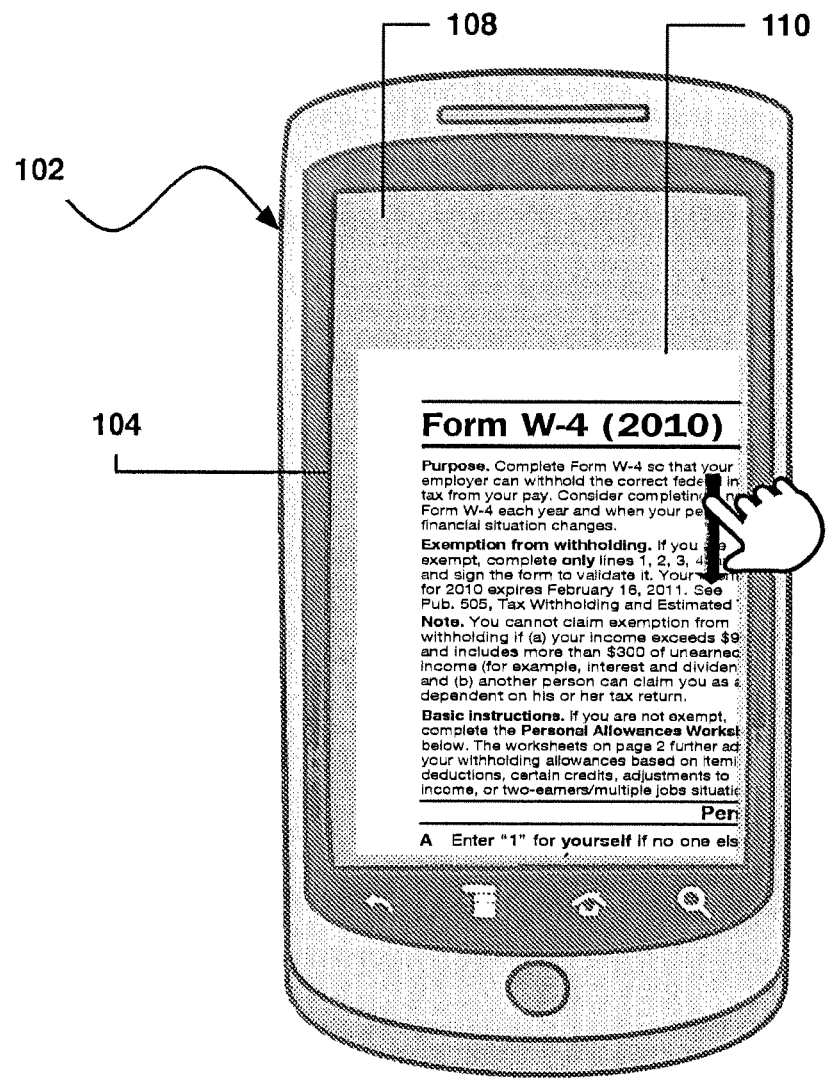
FIG. 1B is a diagram of the mobile device of FIG. 1A, with an applied elastic canvas visual effect.

One implementation of the elastic canvas visual effect is shown in FIG. 1A and FIG. 1B. The displayed content 106 in FIG. 1A is IRS Form W-4. The user may scroll through the document by dragging a finger on the touchscreen 104.

Referring to FIG. 1B, if a user scrolls up until the beginning of the document is reached, an elastic canvas visual effect is displayed by applying an affine transformation to the displayed content 106, resulting in transformed content 110. In this case, the displayed content 106 is transformed using an affine transformation to make the content 110 appear compressed in the vertical direction.

Figure 2A:
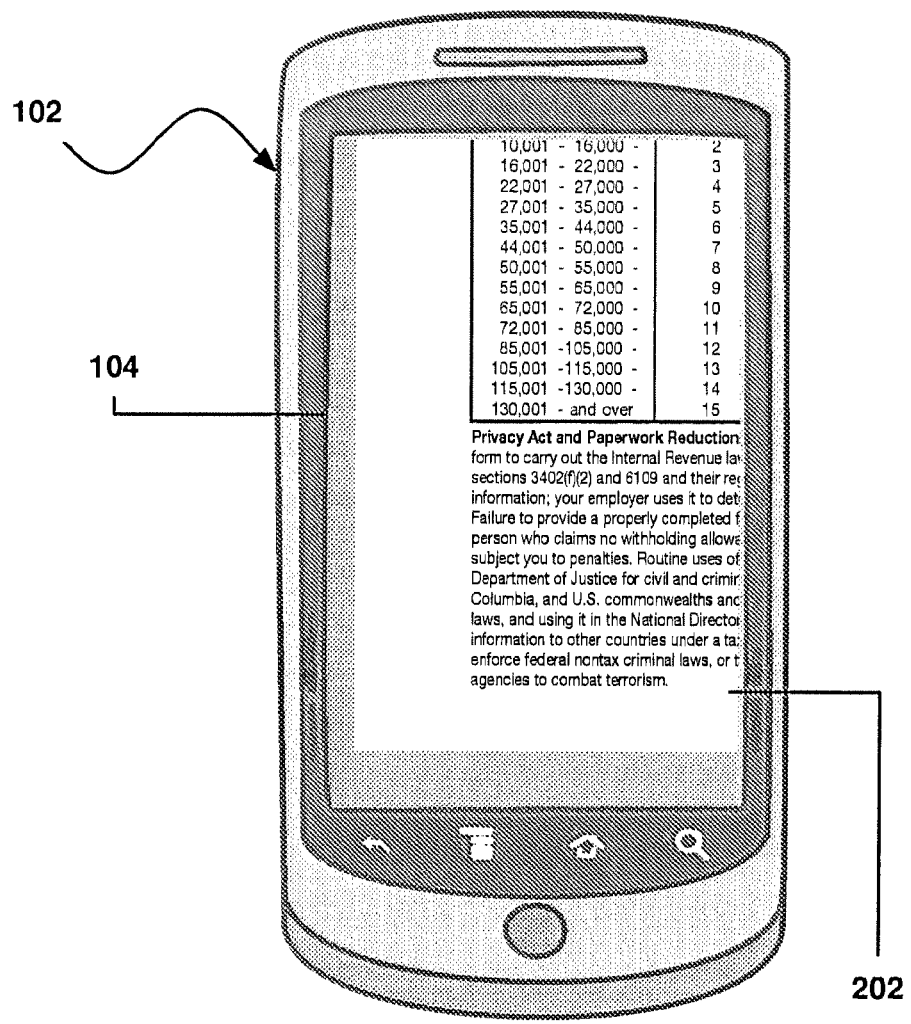
FIGS. 2A and 2B are diagrams of mobile devices illustrating another applied elastic canvas visual effect.
Figure 2B:
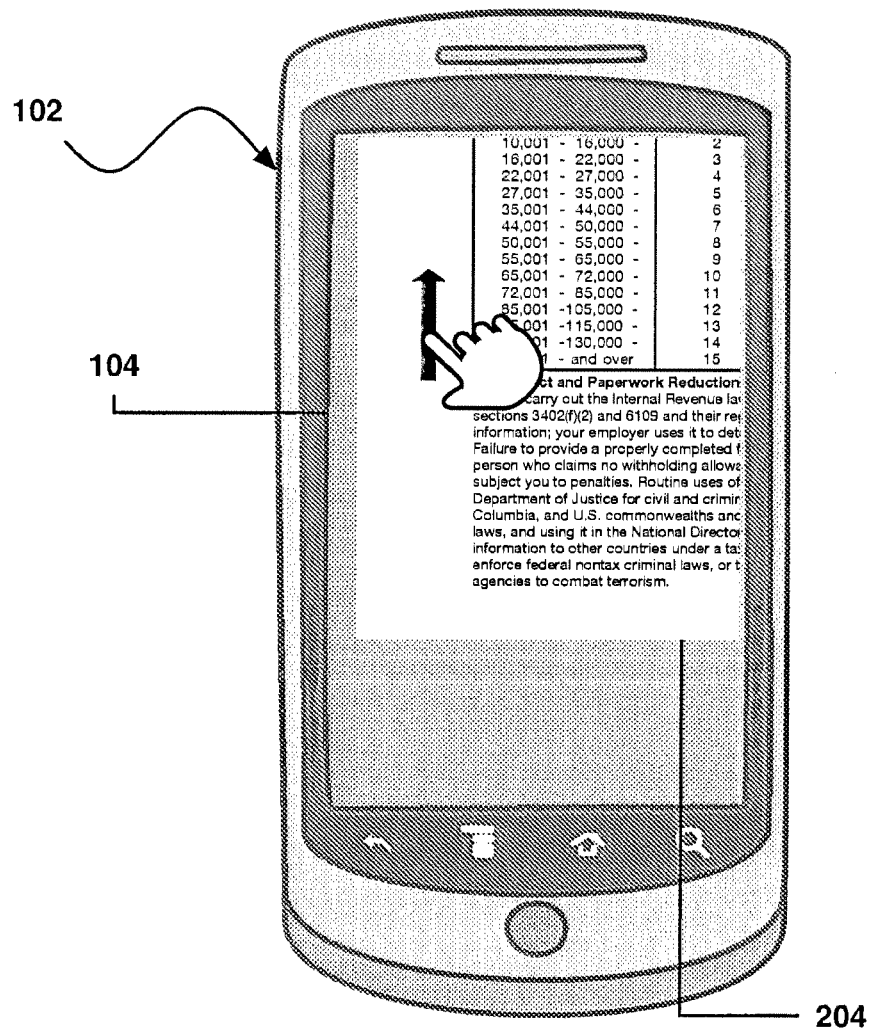

Similarly, FIG. 2A and FIG. 2B show the use of an elastic canvas visual effect when the end of the document is reached. In this case, the displayed content 202 is transformed, resulting in content 204. One skilled in the art will appreciate that additional transformations may be employed to create an elastic canvas visual effect including, without limitation, non-linear transformations, transformations in multiple dimensions (such as in both the horizontal and vertical directions), and the like.

Figure 3:
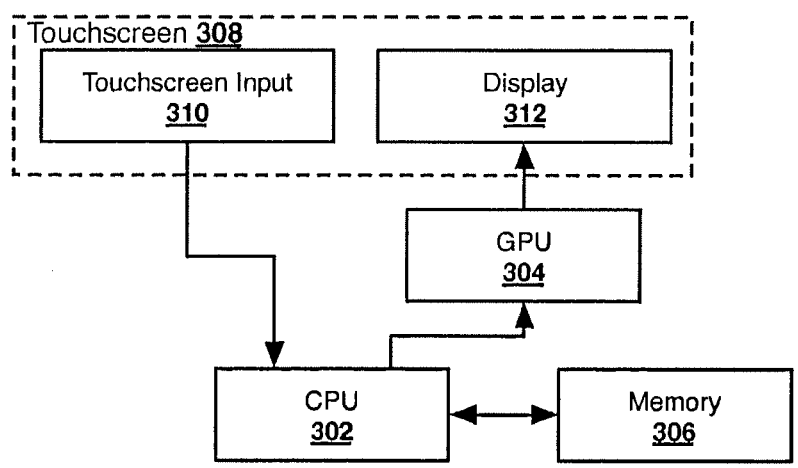
FIG. 3 is a block diagram of a mobile device 102 according to one implementation.

Referring to FIG. 3, the mobile device 102 includes a central processing unit (CPU) 302 coupled to a touchscreen 308. The touchscreen 308 includes a display 312 and an input mechanism. In this case, the input mechanism is provided by touchscreen input 310. In some implementations, a graphics processing unit (GPU) 304 is used to offload and accelerate graphics rendering and processing. The GPU 304 shown in FIG. 3 is placed between the CPU 302 and the display 312. In this implementation, the GPU 304 is configured with dedicated graphics memory (not shown); however, it is possible to configure the GPU 304 to share memory 306. Memory 306 provides random access memory used by the CPU 302 to execute the operating systems and applications. The operating systems, applications, data, and the like may be stored in memory 306 or may be stored in another data storage device such as, for example, a hard drive, a Flash memory device, a non-volatile memory, and the like.

The CPU 302 is used to execute an operating system and/or applications that implement an elastic canvas visual effect in a user interface. Such operating system components and/or applications that implement this functionality in any non-transitory computer readable media.

Figure 4:
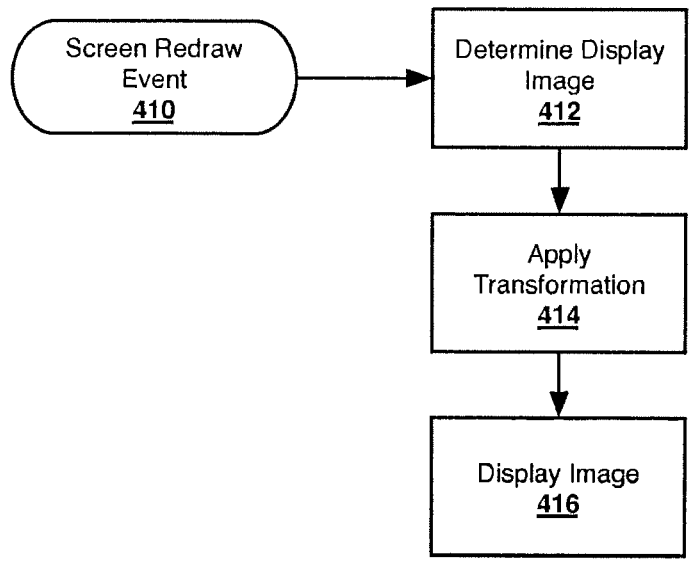
FIG. 4 depicts a method for displaying an elastic canvas visual effect in a user interface system.
Figure 4:
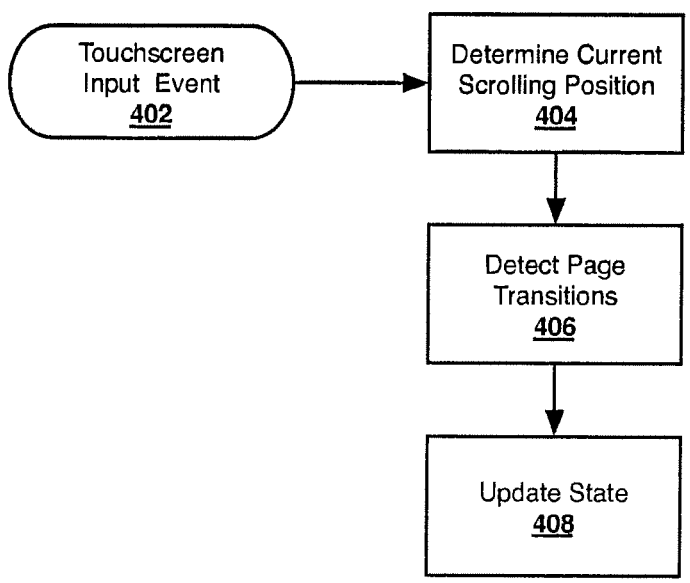

FIG. 4 is a flow chart showing one technique for implementing an elastic canvas visual effect in a user interface. First, whenever touchscreen input events are received (402), the system determines the current scrolling position (404) for the displayed content 106. Based on the current scrolling position, the system detects page transitions (406) and then updates the current transformation state (408) accordingly.

Next, whenever a screen redraw event occurs (410), the system first determines the display image (412). Then, the system applies a transformation (414) to the display image based on the current transformation state. The transformed image is then displayed (416).

FIGS. 5A-5G list the relevant source code one implementation of the elastic borders effect, specific to BeamReader PDF Viewer for Android. Although the code uses Android specific APIs for drawing operations and UI event handling (for demonstration purposes only), one skilled in the art would understand how to port the main logic to other platforms.

There are two entry points in the code that are called by the OS—on TouchEvent( ) and on Draw( ) The on TouchEvent( ) entry point handles touch screen events such as MotionEvent.ACTION_DOWN, MotionEvent.ACTION_MOVE and MotionEvent.ACTION_UP events. The on Draw( ) entry point is called by the OS when the screen content must be redrawn by the application.

In this example, the main logic of the elastic canvas visual effect is implemented in paint( ) and detectPageTransition( ) methods.

The detectPageTransition( ) method is called on any "touch move" event by on TouchEvent( ) method. It detects whether or not the current scrolling position reached the page edge, based on the values stored in scrollX and scrollY variables, and whether the page content needs to be "stretched" or "squeezed". It stores resulting values of the level of deformation in upPageTransition and downPageTransition variables. The deformation level values specify how far the page content needs to be stretched or squeezed. The sign of the values specifies deformation direction—stretching if a value is positive and squeezing if a value is negative. These values will be used by paint( )method to perform the actual visual deformation.

The paint( ) method is called by on Draw( ) OS callback when the page content is rendered and ready to be displayed. The pre-rendered page content is stored as a bitmap image in the global "bitmap" variable. Before drawing anything on the canvas, paint( ) method calculates deformation (scale) coefficients for both X and Y axis if the current scroll position (scrollX and scrollY) is outside of the page bounds. The coefficients are then used as scale parameters in the transformation matrix stored in the global "m" variable. The value of "m" variable represents a linear transformation matrix (affine map) used by the OS to apply different types of transformation to any drawing operations.

Optimized affine transformation functionality, in this case, is provided by the OS. The underlying implementation of a graphic framework in any OS in many cases uses hardware acceleration provided by GPU's and vector co-processors depending on their availability. This makes affine transformation matrices a fast and efficient way to perform linear transformation of graphic shapes on most computers and mobile devices.

After the transformation matrix is populated, the paint( ) method draws the page content on the canvas using the matrix to transform every drawing operation.

This approach decouples transformation and drawing logic. It allows easily disable, enable or modify the elastic effect parameters by changing matrix values while the drawing logic remains unmodified. It also uses hardware acceleration that is available on most computers and mobile devices.

In some implementations, it may be desirable to enable the elastic canvas visual effect for different screen sizes, resolutions, and touchscreen sensitivities. The elastic canvas visual effect may be adjusted to provide for improved experience for a particular device. For example, in some implementations, the level of deformation is controlled based on touchscreen characteristics. This parameter controls the level of canvas scale (e.g., stretching/squeezing) used for the elastic canvas visual effect. A large canvas scale causes greater deformation of the displayed content. Because visual effects appear differently at different screen resolutions, a small effect may be evident on one device having greater screen resolution, but may not be as noticeable on another device having a lower screen resolution, or vice versa. Depending on a screen resolution the canvas needs to be scaled by different number of pixels in order to achieve similar visual effect on devices with different screen resolution and density.

Another parameter that may be varied based on device characteristics is the inertial deceleration speed. This parameter affects speed of inertial scrolling. It may be adjusted based on screen resolution and density to achieve consistency in inertial scrolling speed across different devices. Touchscreen events are measured in pixels and so, for example, a 3 millimeter finger swipe on a lower density screen will cover a different number of pixels than an equivalent finger swipe on a high density screen. The inertial deceleration speed used as part of the visual canvas effect may be adjusted for this difference in touch screen sensitivity.

Furthermore, in some implementations, it is desirable to enable users to scroll through a screen/page simply by tilting the mobile device. This can be implemented using mobile device 102 accelerometer(s). While doing so however, it may be desirable to help the user avoid an unintentional screen/page transition for the same reasons as above. Combination of scrolling via tilting with the elastic canvas visual effect provides the user with visual feedback and elastic resistance to overcome (e.g., via a jolt while tilting or by a finger swipe on the touchscreen with sufficient inertia to overcome the elasticity of the current screen) in order to give the user control of screen/page transition.

In addition, for some implementations, the user may want for vertical scrolling of the screen/page to happen in an automated fashion at a set speed without having to touch the screen. It may become tedious for the user to continuously touch the screen in order to scroll. For instance, when reading a book, the user only needs to make movement when changing the page instead of having to make a constant motion as currently required when scrolling on mobile device.

In order to accomplish this, the system may enable a user to set a scrolling speed, and then to start automated scroll with one action and stop automated scroll with another action. In one implementation, the user continues to receive feedback when the end of the current page is reached on the screen and take action to move to the next page, similarly to flipping a page in a book. The automated scrolling will pause at the end of each page requiring the user to provide a slight tilt jolt (or action on the touch screen) to overcome the elasticity of the current screen. The automated scrolling will then continue on the next page.

Furthermore, in some implementations, the elastic canvas visual effect is also used in conjunction with inertial scrolling. When user scrolls page content and then quickly removes the finger from the screen the page continues its motion and slowly decelerates until complete stop. If an edge of the page is reached during this animated inertial scrolling then elastic effect takes place to perform visual deformation of the page content as described above. The level of deformation is determined based on the speed of animated scrolling, or the speed with which user performed initial scrolling causing the inertial motion. On Google Android, this animation effect may be achieved by using built-in functionality that performs animated scrolling using different types of interpolators, including by way of example, android.widget.Scroller and android.view.animation.DecelerationInterpolator. The source code listed in FIGS. 5A-5G illustrate this point.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A user interface method for use in a device having a touchscreen, the method comprising:
   maintaining the state of content displayed on the device;
   determining a display image;
   applying a transformation to at least a portion of the display image based on the maintained state of the content displayed on the device; and
   displaying the image on the device,
   wherein maintaining the state of the content displayed on the device includes detecting transitions and updating the state based on detected transitions including maintaining information regarding the portion of the content that is displayed, whereby displaying the image on the device performs an elastic canvas visual effect which includes applying a transformation to at least a portion of the display image based on the maintained state of the content displayed on the device in a way that is responsive to a user gesture to initiate a transition where the transformation of the image is based on and responsive to the characteristics of the user's gesture and includes stretching or squeezing at least a portion of the display image in a first direction and a second direction.

2. The user interface method of claim 1, wherein detecting transitions includes detecting screen transitions.

3. The user interface method of claim 1, wherein detecting transitions includes detecting page transitions.

4. The user interface method of claim 1, wherein the content is a document.

5. The user interface method of claim 1, wherein applying a transformation includes applying an affine transformation to at least a portion of the display image.

6. The user interface method of claim 1, further comprising:
scrolling the content displayed on the device.

7. The user interface method of claim 6, wherein scrolling the content is controlled by an accelerometer.

8. The user interface method of claim 6, wherein scrolling the content is performed automatically.

9. The user interface method of claim 6, wherein the applying a transformation to at least a portion of the display image includes determining a scroll rate, and applying a transformation based on the determined scroll rate.

10. The user interface method of claim 1, wherein applying a transformation to at least a portion of the display image includes determining a characteristic of the touchscreen, and applying a transformation based on the determined characteristic of the touchscreen.

11. The user interface method of claim 10, wherein the characteristic of the touchscreen is screen density.

12. The user interface method of claim 10, wherein the characteristic of the touchscreen is screen resolution.

13. A device including a central processing unit, a touchscreen unit, and a non-transitory computer readable medium storing software usable to cause the device to perform a method comprising:
maintaining the state of content displayed on the device;
determining a display image;
applying a transformation to at least a portion of the display image based on the maintained state of the content displayed on the device; and
displaying the image on the device,
wherein maintaining the state of the content displayed on the device includes detecting transitions and updating the state based on detected transitions including maintaining information regarding the portion of the content that is displayed, whereby displaying the image on the device performs an elastic canvas visual effect which includes applying a transformation to at least a portion of the display image based on the maintained state of the content displayed on the device in a way that is responsive to a user gesture to initiate a transition where the transformation of the image is based on and responsive to the characteristics of the user's gesture and includes stretching or squeezing at least a portion of the display image in a first direction and a second direction.

14. A device comprising:
a touchscreen;
a processor; and
a data storage, the data storage including software usable during the display of content to cause the device to perform an elastic canvas visual effect including maintaining information regarding the portion of the content that is displayed and applying a transformation to at least a portion of the display image based on the maintained state of the content displayed on the device in a way that is responsive to a user gesture to initiate a transition where the transformation of the image is based on and responsive to the characteristics of the user's gesture and includes stretching or squeezing at least a portion of the display image in a first direction and a second direction.

15. A user interface method for use in a device having a touchscreen, the method comprising:
displaying content on the touchscreen;
detecting a transition to remove the display of the content from the touchscreen;
applying an elastic canvas visual effect including at least one of a stretching or squeezing of at least a portion of the displayed content responsive to the detected transition effect including maintaining information regarding the portion of the content that is displayed and applying a transformation to at least a portion of the display image based on the maintained state of the content displayed on the device in a way that is responsive to a user gesture to initiate a transition where the transformation of the image is based on and responsive to the characteristics of the user's gesture and includes stretching or squeezing at least a portion of the display image in a first direction and a second direction.

* * * * *